United States Patent
Keohane et al.

(10) Patent No.: US 9,281,952 B2
(45) Date of Patent: Mar. 8, 2016

(54) SYSTEM AND METHOD FOR ADDING MEMBERS TO CHAT GROUPS BASED ON ANALYSIS OF CHAT CONTENT

(75) Inventors: Susann Marie Keohane, Austin, TX (US); Gerald Francis McBrearty, Austin, TX (US); Shawn Patrick Mullen, Buda, TX (US); Jessica Carol Murillo, Round Rock, TX (US); Johnny Meng-Han Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1980 days.

(21) Appl. No.: 11/867,735

(22) Filed: Oct. 5, 2007

(65) Prior Publication Data

US 2009/0094536 A1  Apr. 9, 2009

(51) Int. Cl.
  *G06F 3/14* (2006.01)
  *H04L 12/18* (2006.01)
  *G06Q 10/10* (2012.01)
  *H04L 12/58* (2006.01)
(52) U.S. Cl.
  CPC .......... *H04L 12/1822* (2013.01); *G06Q 10/107* (2013.01); *H04L 12/581* (2013.01); *H04L 51/04* (2013.01)
(58) Field of Classification Search
  CPC .................................. G06F 3/14; G06F 3/17
  USPC .......... 715/200–277; 700/701–799, 800–866; 709/201–230; 705/50–79; 345/30–111; 348/206–231.9; 379/67.1, 80; 719/310; 706/20; 707/1–10, 100–104.1, 707/200–206
  See application file for complete search history.

(56) References Cited

U.S. PATENT DOCUMENTS

| | | | |
|---|---|---|---|
| 7,444,328 B2 * | 10/2008 | Starbuck | |
| 7,603,413 B1 * | 10/2009 | Herold et al. | 709/204 |
| 2003/0065721 A1 | 4/2003 | Roskind | G06F 15/16 |
| 2004/0154022 A1 * | 8/2004 | Boss et al. | 719/310 |
| 2004/0162795 A1 * | 8/2004 | Dougherty et al. | 706/20 |
| 2005/0198131 A1 | 9/2005 | Appelman et al. | G06F 15/16 |
| 2005/0262199 A1 | 11/2005 | Chen et al. | G06F 15/16 |
| 2006/0227943 A1 * | 10/2006 | Yan | 379/67.1 |
| 2006/0259551 A1 * | 11/2006 | Caldwell, Jr. | 709/204 |
| 2007/0005782 A1 * | 1/2007 | Zheng | 709/230 |
| 2007/0011155 A1 * | 1/2007 | Sarkar | 707/5 |
| 2007/0081636 A1 * | 4/2007 | Shaffer et al. | 379/80 |

OTHER PUBLICATIONS

Law et al., "Smart Instant Messenger in Pervasive Computing Environments," Lecture Notes in Computer Science (including subseries Lecture Notes in Artificial Intelligence and Lecture Notes in Bioinformatics), v 3947 LNCS, Advances in Grid and Pervasive Computing—First International Conference, GPC 2006, Proceedings, 2006, p. 32-41, 1st International Conference on Grid and Pervasive Computing,GPC 2006, May 3-5, 2006, Taichung, Taiwan.

* cited by examiner

*Primary Examiner* — Ruay Ho
(74) *Attorney, Agent, or Firm* — VanLeeuwen & VanLeeuwen; Steven L. Bennett

(57) ABSTRACT

A system, method, and program product is provided that selects an instant messaging message that includes one or more words in a text area. The instant message is a communication with an instant messaging participant that corresponds to an instant messaging participant identifier. A count is kept of the words that match keywords that are associated with a selected instant messaging group data store that is stored in a nonvolatile data area. If the count exceeds a particular threshold, the instant messaging participant identifier is added to the selected instant messaging group.

20 Claims, 6 Drawing Sheets

SYSTEM AND METHOD FOR ADDING MEMBERS TO CHAT GROUPS BASED ON ANALYSIS OF CHAT CONTENT

BACKGROUND OF THE INVENTION

1. Technical Field

The present invention relates to a system and method that adds members to instant messaging chat groups. More particularly, the present invention relates to a system and method that selects members to add to instant messaging chat groups based upon analysis of instant message content.

2. Description of the Related Art

Instant messaging has become a critical communications technology for many users and organizations. Instant messaging allows a user to create a "session" with one or more other users so that messages can be sent back and forth contemporaneously. The flow of messages in an instant message session creates a dialog between the user and other users with whom the user has established a session. In this manner, quick messages can be transmitted without sending an email message or telephoning the other user. Users can choose whether and when to respond to instant messages, much like an email message. However, unlike email messages, in instant messaging, a window is displayed on the user's display showing the messages between the user and another user.

A typical use of instant messaging is the ability to engage in "off-line" discussions during a telephone conference call. For example, in a negotiations conference call between two organizations, individuals within an organization can use instant messaging to ask each other questions and make other comments about topics being discussed in the conference call without having to remember such questions and comments and discuss them after the call has completed. Being able to have such "off-line" discussions enables the conference call participants to be better informed and more efficient so that more work is accomplished during the conference call and fewer "follow-up" calls are needed to resolve negotiation issues.

One challenge in using instant messaging, however, is the user's maintenance of his or her instant messaging groups. An instant messaging group is a group of instant messaging participants with a common theme. For example, if a user is involved in a project code-named "Phoenix," he may add a instant messaging group to store participants of the group (e.g., naming the group "Phoenix"). When the user wants to communicate with all members of the Phoenix group using instant messaging, an instant messaging session can be opened with the Phoenix group and instant messaging messages entered by the user are sent to all members of the group that are currently active (e.g., logged on). One challenge in maintaining these groups is sometimes attributable to the fluid nature of groups and group participants. The user may be discussing the Phoenix project with a particular instant messaging participant and not realize that this particular instant messaging participant has not been added to the Phoenix instant messaging group. When the user subsequently sends a message to the Phoenix instant messaging group, he may erroneously assume that the particular participant received the instant messaging when, in fact, the participant did not receive the message because the participant was never added to the Phoenix group.

SUMMARY

It has been discovered that the aforementioned challenges are resolved using a system, method and computer program product that selects an instant messaging message that includes one or more words in a text area. The instant message is a communication with an instant messaging participant that corresponds to an instant messaging participant identifier. A count is kept of the words that match keywords that are associated with a selected instant messaging group data store that is stored in a nonvolatile data area. If the count exceeds a particular threshold, the instant messaging participant identifier is added to the selected instant messaging group.

In one embodiment, the threshold is set to one (1). In another embodiment, prior to adding the participant identifier to the selected instant messaging group, the count is compared to threshold. If the count exceeds the threshold, a user is prompted as to whether to add the instant messaging participant to the selected instant messaging group. In this embodiment, the participant is only added if the user indicates that the participant should be added to the instant messaging group.

In another embodiment, the selected instant messaging message is one of a set of instant messaging messages being communicated during an instant messaging session that is currently being conducted between the instant messaging participant and the user of the computer system. In this embodiment, the steps are performed until the participant is added to one of the user's instant messaging groups.

In one embodiment, the instant messaging message is one of a set of instant messaging messages previously communicated during one or more past instant messaging sessions. In this embodiment, prior to selecting the instant messaging message, a set of instant messaging messages are retrieved from an instant messaging archive data store. A set of instant messaging groups are retrieved with each of the groups including a set of instant messaging participant identifiers, and the instant messaging groups each have associated keywords. If the instant messaging participant's identifier is not included in the selected instant messaging group data store, then the selecting, the identifying, and the adding are performed.

In a first further embodiment, the count corresponding to each of the keywords that matches the one or more words is maintained. When one of the counts exceeds a threshold, the user is prompted as to whether to add the instant messaging participant to the selected instant messaging group. In this further embodiment, the instant messaging participant is only added when the user requests that the participant be added to the instant messaging group.

In a second further embodiment, prior to retrieving the messages and the groups, the system gathers keywords associated with the group. The gathering including identifying a select instant messaging group corresponding to one of the plurality of instant messaging group data stores with which each of the retrieved messages was communicated, retrieving a keywords data store corresponding to the select instant messaging group, identifying non-trivial words that are unique and included in the retrieved plurality of instant messaging messages, and storing the identified unique, non-trivial words in the retrieved keywords data store.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
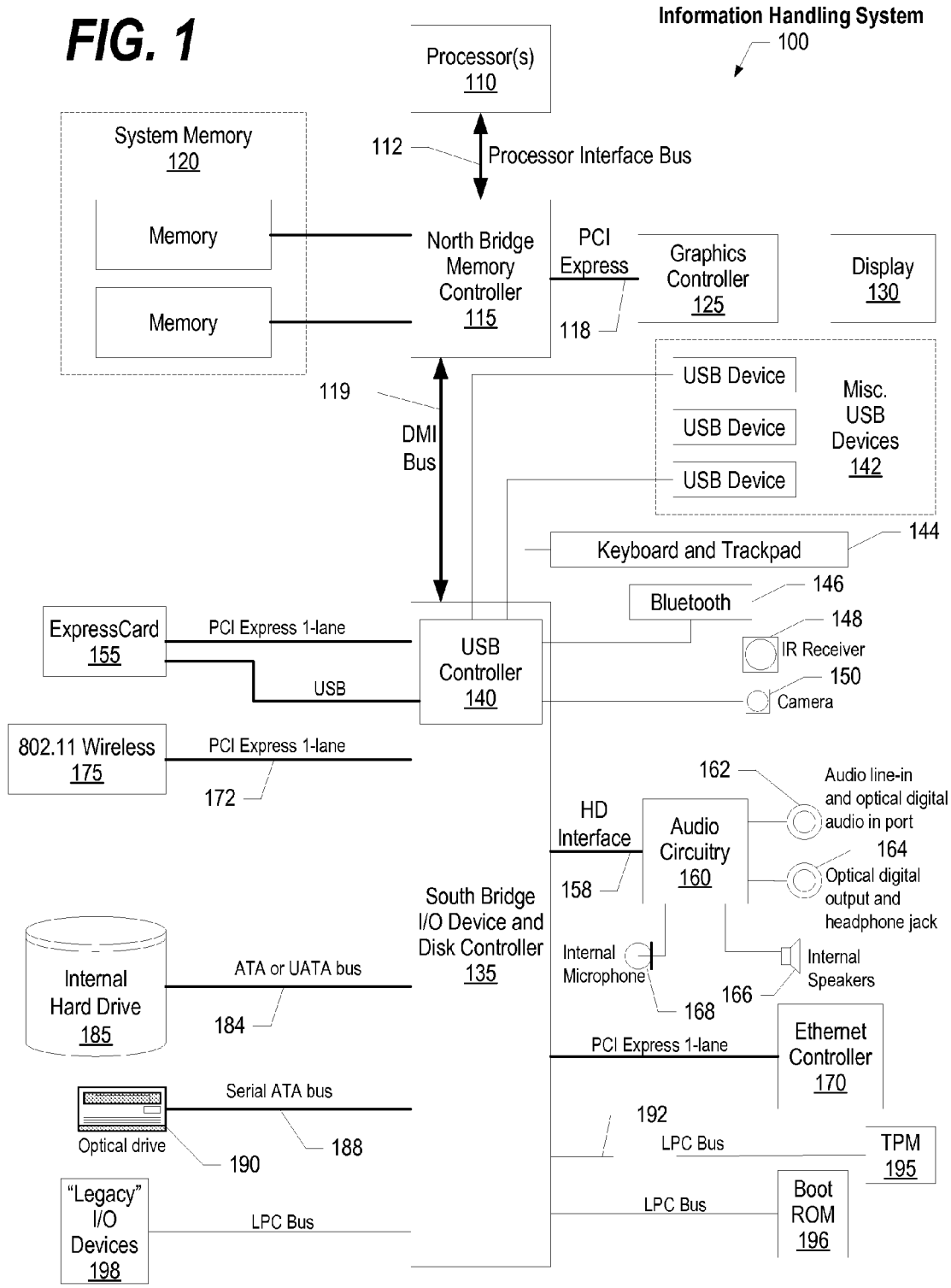
FIG. 1 is a block diagram of a data processing system in which the methods described herein can be implemented.
Figure 2:
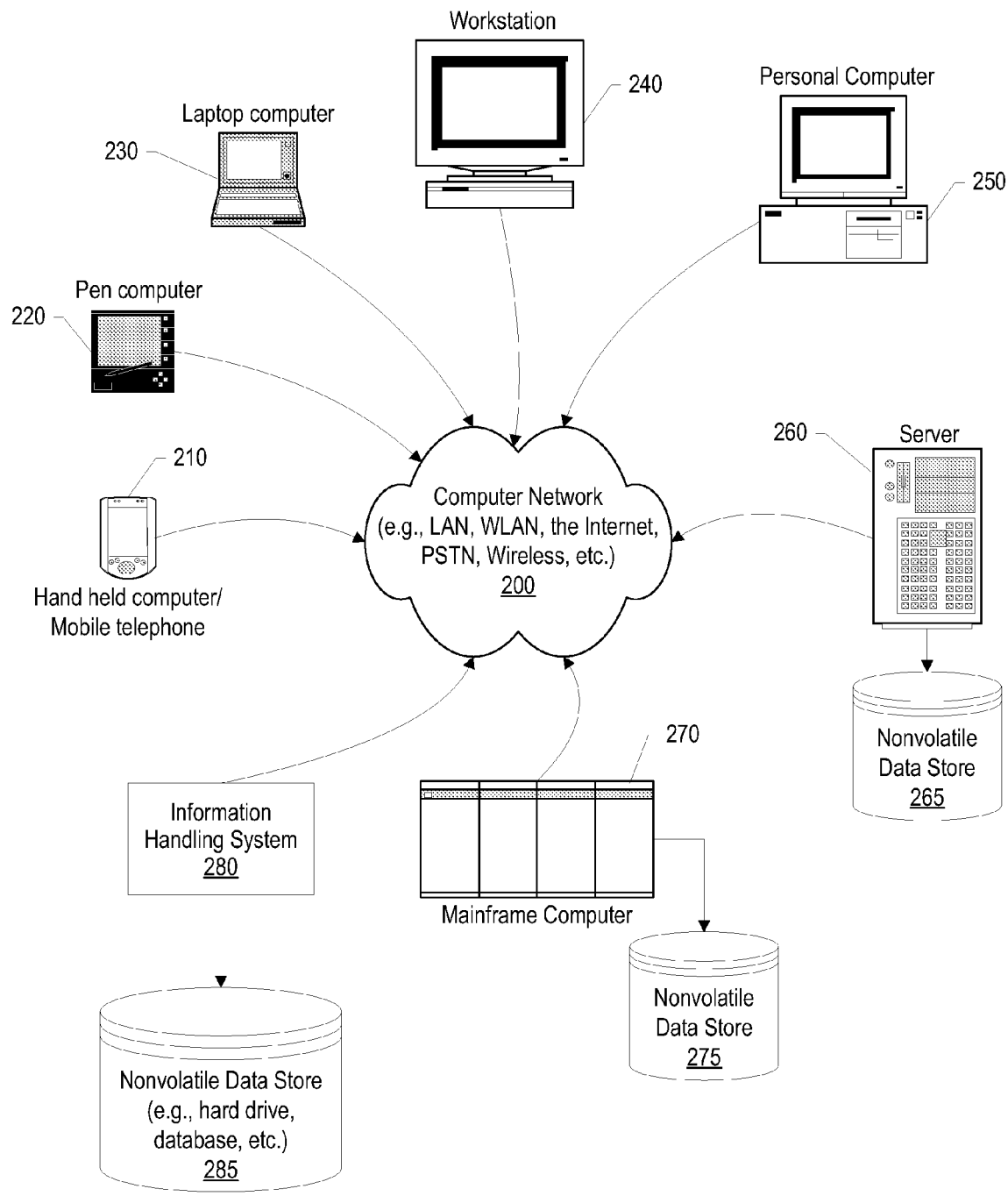
FIG. 2 provides an extension of the information handling system environment shown in FIG. 1 to illustrate that the methods described herein can be performed on a wide variety of information handling systems which operate in a networked environment.

FIG. 1 illustrates information handling system 100 which is a simplified example of a computer system capable of performing the computing operations described herein. Information handling system 100 includes one or more processors 110 which is coupled to processor interface bus 112. Processor interface bus 112 connects processors 110 to Northbridge 115, which is also known as the Memory Controller Hub (MCH). Northbridge 115 is connected to system memory 120 and provides a means for processor(s) 110 to access the system memory. Graphics controller 125 is also connected to Northbridge 115. In one embodiment, PCI Express bus 118 is used to connect Northbridge 115 to graphics controller 125. Graphics controller 125 is connected to display device 130, such as a computer monitor.

Northbridge 115 and Southbridge 135 are connected to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus is used to connect the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses can include PCI and PCI Express busses, an ISA bus, a System Management Bus (SMBus or SMB), a Low Pin Count (LPC) bus. The LPC bus is often used to connect low-bandwidth devices, such as boot ROM 196 and "legacy" I/O devices (using a "super I/O" chip). The "legacy" I/O devices (198) can include serial and parallel ports, keyboard, mouse, floppy disk controller. The LPC bus is also used to connect Southbridge 135 to Trusted Platform Module (TPM) 195. Other components often included in Southbridge 135 include a Direct Memory Access (DMA) controller, a Programmable Interrupt Controller (PIC), a storage device controller, which connects Southbridge 135 to nonvolatile storage device 185, such as a hard disk drive, using bus 184.

ExpressCard 155 is a slot used to connect hot-pluggable devices to the information handling system. ExpressCard 155 supports both PCI Express and USB connectivity as it is connected to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, Bluetooth device 146 which provides for wireless personal area networks (PANs), keyboard and trackpad 144, and other miscellaneous USB connected devices 142, such as a mouse, portable storage devices, modems, network cards, ISDN connectors, fax, printers, USB hubs, and many other types of USB connected devices.

Wireless Local Area Network (LAN) device 175 is connected to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 is connected to Southbridge 135 using Serial ATA (SATA) bus 188. Serial ATA adapters and devices communicate over a high-speed serial link. The Serial ATA bus is also used to connect Southbridge 135 to other forms of storage devices, such as hard disk drives. Audio circuitry 160, such as a sound card, is connected to Southbridge 135 via bus 158. Audio circuitry 160 is used to provide functionality such as audio line-in and optical digital audio in port 162, optical digital output and headphone jack 164, internal speakers 166, and internal microphone 168. Ethernet controller 170 is connected to Southbridge 135 using a bus, such as the PCI or PCI Express bus. Ethernet controller 170 is used to connect information handling system 100 with a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems which operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling system include nonvolatile data stores, such as hard drives and/or nonvolatile memory. Some of the information handling systems shown in FIG. 2 are depicted with separate nonvolatile data stores (server 260 is shown with nonvolatile data store 265, mainframe computer 270 is shown with nonvolatile data store 275, and information handling system 280 is shown with nonvolatile data store 285). The nonvolatile data store can be a component that is external to the various information handling systems or can be internal to one of the information handling systems. In addition, while not shown, an individual nonvolatile data store can be shared amongst two or more information handling systems using various techniques.

Figure 3:
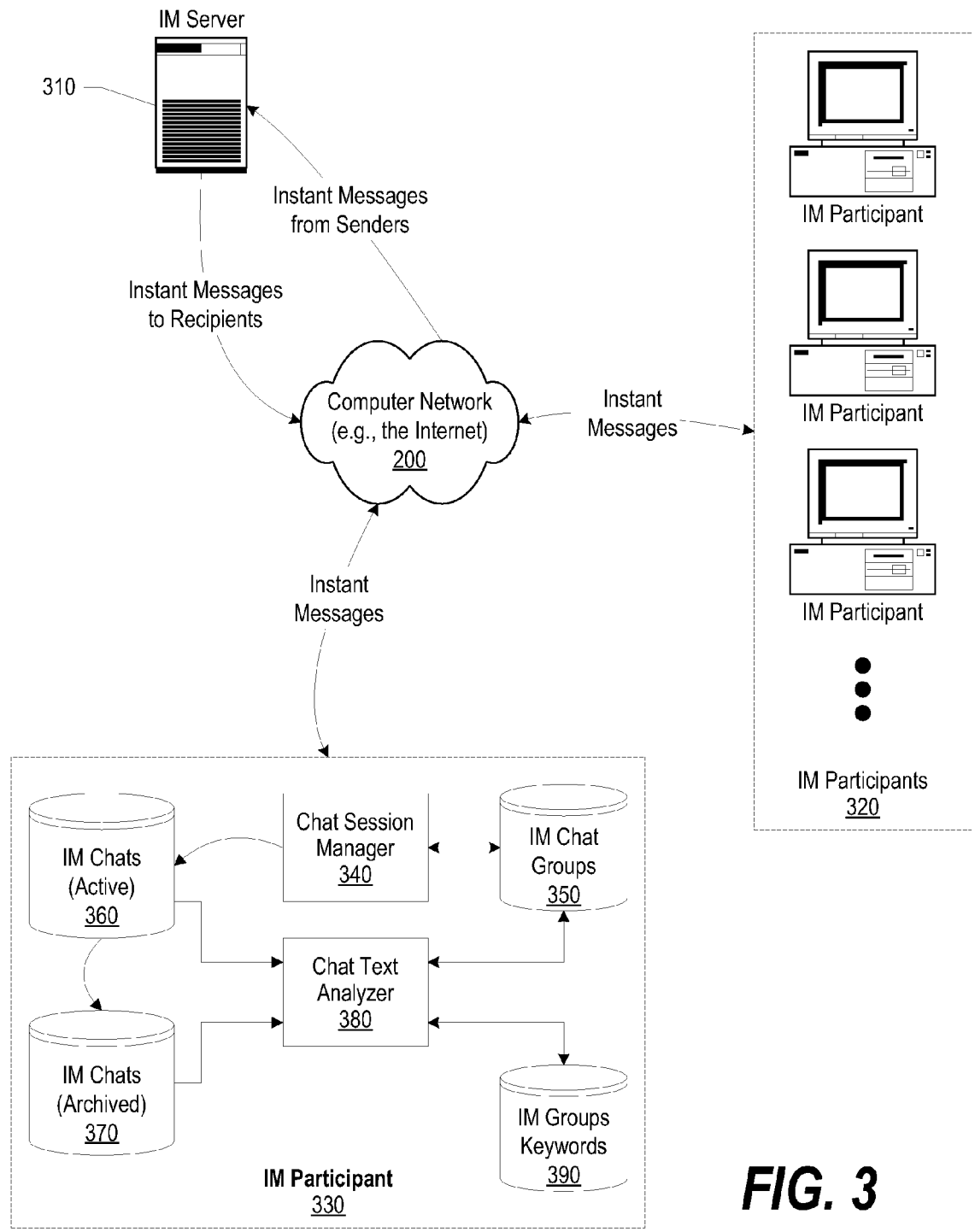
FIG. 3 is a system diagram showing components used to add members to an instant messaging group.

FIG. 3 is a system diagram showing components used to add members to an instant messaging group. Computer network 200 is used to interconnect instant messaging participants 320 with instant messaging participant 330 via instant messaging server 310. Instant messaging messages are sent and received by each of the participants. When an instant messaging participant sends a message, it travels through computer network 200 where it is received by instant messaging server 310. Instant messaging server 310 determines the target participant (or participants) and forwards the instant messaging message to the target participant(s).

Instant messaging participant 330 (the user) is detailed to depict components used to add one or more of participants 320 to the user's instant messaging groups. These components include instant messaging session manager 340, and instant messaging message text analyzer 380. As the name implies, instant messaging session manager 340 manages active instant messaging sessions that the user conducts with one or more instant messaging participants 320. Instant messaging message text analyzer 380 is used to analyze text in instant messaging messages for keywords to ascertain whether it is advisable to include one or more instant messaging participants 320 in one or more instant messaging groups 350. In addition, instant messaging message text analyzer 380 is used to gather keywords from the user's instant messaging messages sent during various instant messaging sessions.

When the user is engaged in an active instant messaging session, instant messaging session manager 340 stores the instant messaging messages that are communicated between the user and instant messaging participants 320 in a buffer, such as instant messaging active data store 360. If the user is conducting an instant messaging session with a group of instant messaging participants, then the group data (e.g., instant messaging participant identifiers, names, etc.) are retrieved from instant messaging group data store 350. When an instant messaging session is completed, the instant messaging messages that were communicated during the session are added to instant messaging archive data store 370. In addition to the text of the instant messaging messages that were sent and received during the past instant messaging sessions, instant messaging archive data store 370 also includes information such as the instant messaging participant identifier(s) with whom the prior session was conducted and a timestamp either for the instant messaging session or for individual instant messaging messages that indicate the time of the session and/or the instant messaging messages.

Instant messaging message text analyzer 380 analyzes the text included in instant messaging messages of both active instant messaging sessions and archived instant messaging sessions and compares this text to keywords located in instant messaging groups keywords data store 390. The keywords data store includes keywords and groups associated with such keywords. If the user is a member of a group working on a project titled "Phoenix" that has to do with a company's new order entry software platform, words such as "Phoenix," "order entry," "milestones," "deliverables," and the like might be associated with the instant messaging group named "Phoenix." In addition, if the user has an instant messaging group titled "Softball" that is used to communicate with member's of the company's softball team, keywords such as "softball," "game," "inning," and other softball-related words could be associated with the softball instant messaging group. Instant messaging message text analyzer 380 both analyzes the text to ascertain the keywords should be associated with the particular instant messaging groups, but also suggests to the user which participants should be included in a particular instant messaging group based on the instant messaging messages communicated with the particular participant. For example, if a new person recently joined the softball team and the user is conducting an instant messaging session with the new person (one of instant messaging participants 320) discussing an upcoming softball game, instant messaging message text analyzer 380 would recognize that the text of the instant messaging session matches keywords associated with the instant messaging group "softball" and ask the user if the participant should be added to the softball instant messaging group, and the participant is either added or not added depending on the user's answer.

Figure 4:
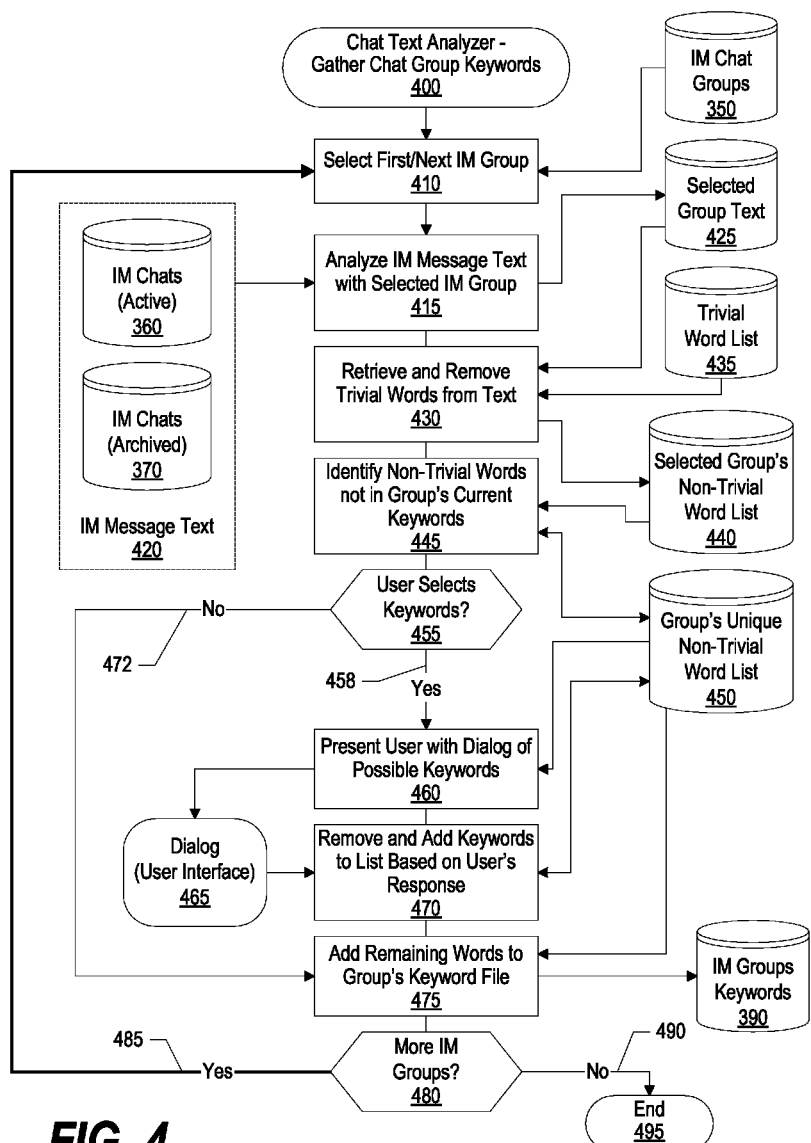
FIG. 4 is a flowchart showing steps taken to gather instant messaging group keywords.

FIG. 4 is a flowchart showing steps taken to gather instant messaging group keywords. Processing commences at 400 whereupon, at step 410 the first instant messaging group is selected from instant messaging groups data store 350. At step 415, instant messaging message text 420 that is included in active instant messaging sessions (e.g., currently on-going) data store 360 as wall as archived instant messaging sessions data store 370 are analyzed, resulting in data store 425 that includes the instant messaging message text for messages communicated with the selected group.

At step 430, trivial word list 435 is used to remove trivial words from selected group text data store 425, resulting in the selected group's non-trivial word list 440. At step 445, the selected group's non-trivial word list 440 is compared to the group's current unique non-trivial word list 450. The non-trivial words that are new to the selected group are added to the group's unique non-trivial word list 450.

A determination is made as to whether the user is prompted to select keywords to add to a group's non-trivial word list (decision 455). If the user is not prompted to select keywords, then decision 455 branches to "no" branch 472 whereupon, at step 475, the non-trivial words that are new to the selected group are added to the instant messaging group keyword data store 390.

On the other hand, if the user is prompted before adding new words to the instant messaging group keyword data store, then decision 455 branches to "yes" branch 458 whereupon, at step 460, the user is presented with dialog 465 (e.g., a graphical user interface, etc.) allowing the user to confirm the addition of the newly found unique non-trivial words stored in data store 450 as well as add or modify the words included in data store 450. At step 470, the system adds, modifies, and removes words from data store 450 as directed by the user. At step 475, the words remaining in data store 450 are added to instant messaging group keywords data store 390.

A determination is made as to whether there are more instant messaging groups to process (decision 480). If there are more instant messaging groups to process, decision 480 branches to "yes" branch 485 which loops back to select and process the next instant messaging group from instant messaging groups data store 350. This looping continues until there are no more instant messaging groups to process, at which point decision 480 branches to "no" branch 490 and the processing used to gather group keywords ends at 495.

Figure 5:
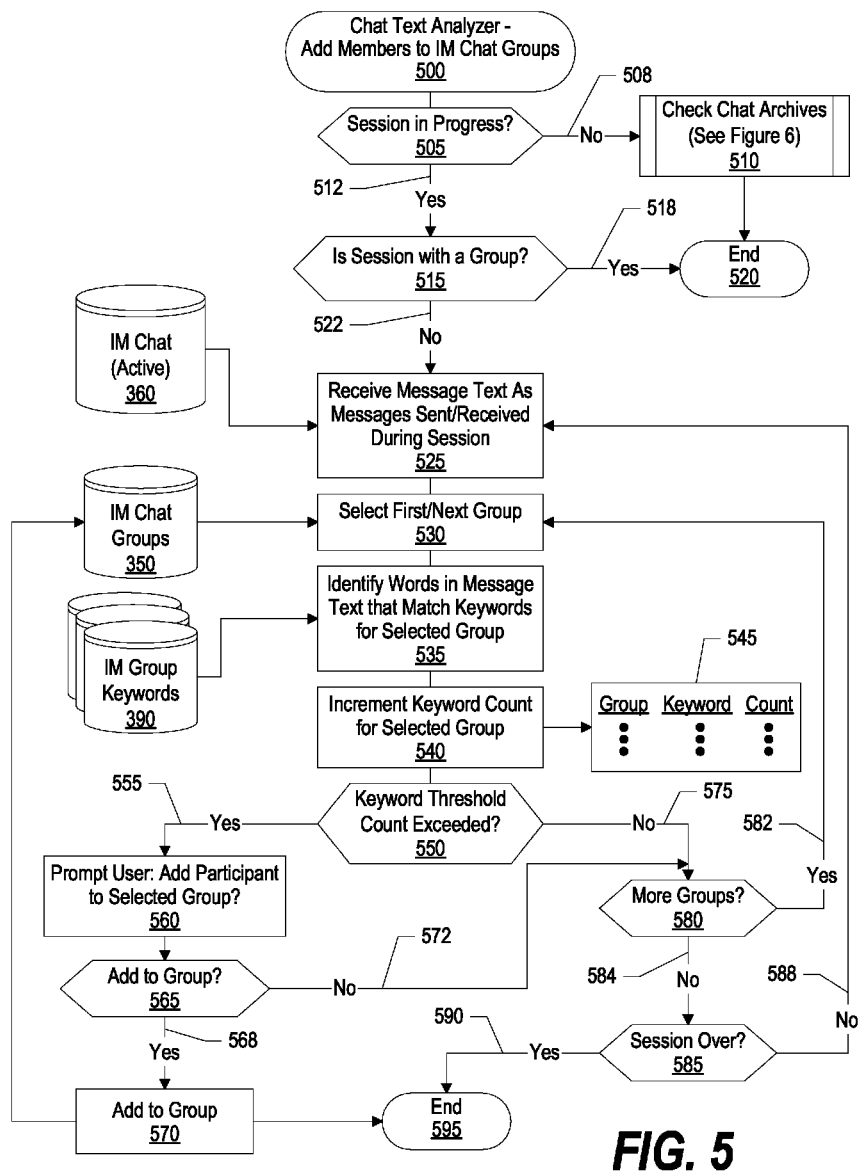
FIG. 5 is a flowchart showing steps taken to add members to instant messaging groups.

FIG. 5 is a flowchart showing steps taken to add members to instant messaging groups. Processing commences at 500 whereupon a determination is made as to whether an instant messaging session is currently in progress (decision 505). If an instant messaging session is not currently in progress, then decision 505 branches to "no" branch 508 whereupon, at predefined process 510, is performed to process instant messaging message archives and processing ends at 520. On the other hand, if an instant messaging session is currently in progress, then decision 505 branches to "yes" branch 512 whereupon another determination is made as to whether the current instant messaging session is a session with an instant messaging group (decision 515). If the instant messaging session that is currently taking place is already with a group, then decision 515 branches to "yes" branch 518 and processing ends at 520.

On the other hand, if the session is not with a group (i.e., the session is with an individual instant messaging participant and not a group), then decision 515 branches to "no" branch 522 and most of the remaining steps of FIG. 5 (with the exception of step 560) preferably taking place in the background. At step 525, instant messaging message text that is currently being sent and received with the other instant messaging participant is received from active instant messaging data store 360 (e.g., a buffer). At step 530 the first instant messaging group is selected from instant messaging group data store 350. At step 535, words in the message text that match keywords retrieved from the instant messaging group keywords data store 390 are identified. In other words, instant messaging keywords data store 390 includes different keywords based upon the instant messaging group. The instant messaging group for the softball team would have softball related keywords associated with the group, whereas the group for the "Phoenix" project at the user's business would have keywords related to the software project.

At step 540, keyword counters 545 are incremented. As shown, counters are maintained for each keyword encountered for the selected group. A determination is made as to whether a keyword counter for the selected instant messaging group has exceeded a threshold (decision 550). In one embodiment, the threshold is one (1). In another embodiment, the thresholds are variable so that the threshold for one keyword may be different than the threshold of another keyword. For example, since the word "Phoenix" is fairly unique, its threshold may be lower than a more generic word such as "milestone" or "deliverable." If the keyword threshold count for one of the keywords has been exceeded, then decision 550 branches to "yes" branch 555 whereupon, at step 560, the user is prompted and asked whether to add the participant to the selected group. A determination is made, based on the user's answer, as to whether to add the participant to the selected group (decision 565). If the user answered affirmatively to add the participant to the selected group, then decision 565 branches to "yes" branch 568 whereupon, at step 570, the participant is added to the selected group and processing thereafter ends at 595. On the other hand, if the user does not choose to add the participant to the selected group, then decision 565 branches to "no" branch 572.

Returning to decision 550, if no keyword threshold count has been exceeded, then decision 550 branches to "no" branch 575. A determination is made as to whether there are more instant messaging groups to analyze (decision 580). If there are more groups to analyze, then decision 580 branches to "yes" branch 582 to loop back to select the next group at step 530 and process the next selected group accordingly. This looping continues until the participant is either added to a group or there are no more groups to process. When there are no more groups to process, decision 580 branches to "no" branch 584 whereupon a determination is made as to whether the user's instant messaging session is over or is still taking place (decision 585). If the session is not yet over, then decision 585 branches to "no" branch 588 which loops back to retrieve one or more additional messages communicated between the user and the instant messaging participant and processing loops through the instant messaging groups as described above to attempt to identify an instant messaging group in which this participant may belong. This looping continues until the instant messaging session is over, at which point decision 585 branches to "yes" branch 590 and processing ends at 595.

Figure 6:
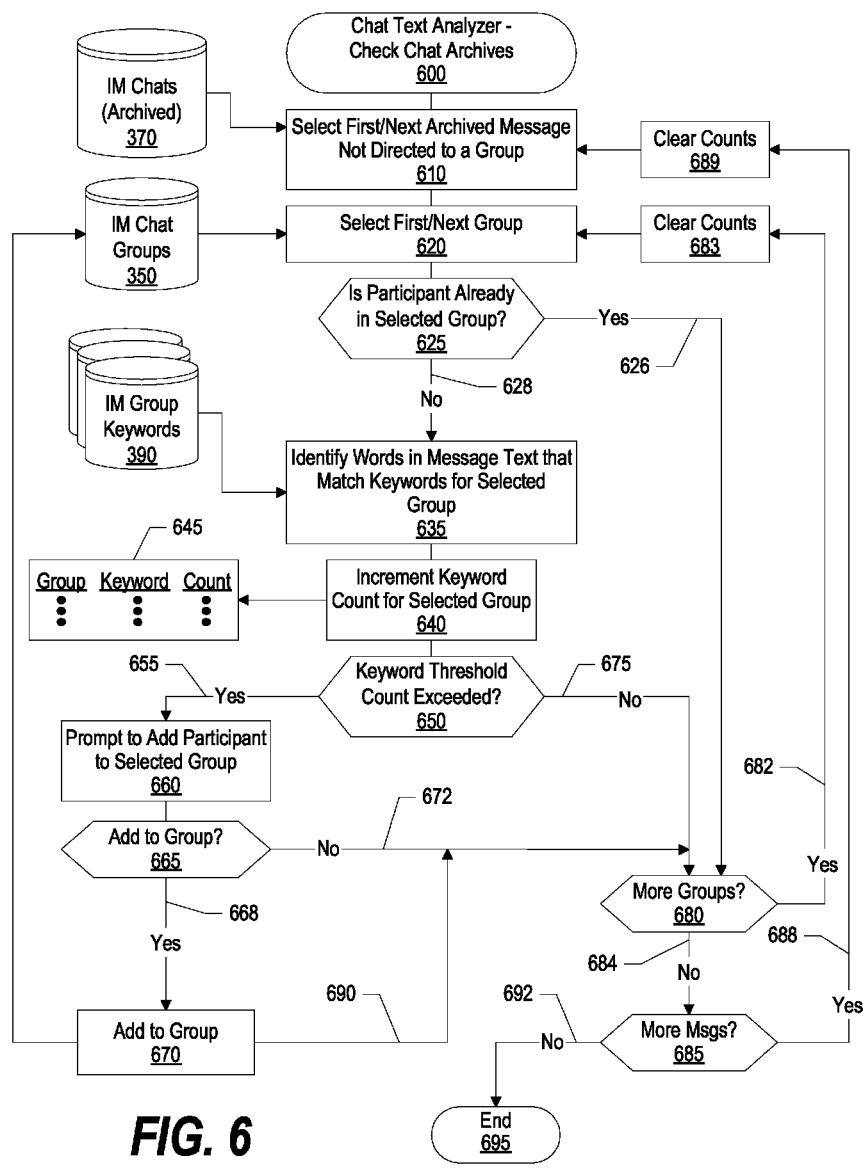
FIG. 6 is a flowchart showing steps taken to review instant messaging message archives and add members to instant messaging groups after analyzing the archives.

FIG. 6 is a flowchart showing steps taken to review instant messaging message archives and add members to instant messaging groups after analyzing the archives. This flowchart is called from predefined process 510 shown in FIG. 5. FIG. 6 processing commences at 600 whereupon, at step 610, the first archived message that was not directed to an instant messaging group is selected from instant messaging message archive data store 370. At step 620, the first instant messaging group is selected from instant messaging groups data store 350.

A determination is made as to whether the participant of the selected archived instant messaging message is already a member of the selected instant messaging group (decision 625). If the participant is already a member, then decision 625 branches to "yes" branch 626 bypassing steps 635 to 670. On the other hand, if the participant is not a member of the selected group, then decision 625 branches to "no" branch 628 whereupon, at step 635, words in the message (one or more instant messaging messages) communicated between the user and the participant are compared to keywords for the selected group that are retrieved from instant messaging group keywords data store 390 to identify matches. At step 640, keyword counts 645 for identified matches are incremented. As previously described in relation to FIG. 5, in one embodiment, the threshold is one (1), and in another embodiment, the thresholds are variable so that the threshold for one keyword may be different than the threshold of another keyword.

A determination is made as to whether the keyword threshold count has been exceeded (decision 650). If the threshold has been exceeded, then decision 650 branches to "yes" branch 655 whereupon, at step 660, the user is prompted as to whether the user wants to add the selected participant to the selected instant messaging group. A determination is made, based on the user's answer, as to whether to add the selected participant to the selected group (decision 665). If the user requested to have the participant added to the group, then decision 665 branches to "yes" branch 668 whereupon, at step 670, the selected participant is added to the selected group. On the other hand, if the user did not request to have the participant added to the selected group, then decision 665 branches to "no" branch 672 bypassing step 670. Returning to decision 650, if the keyword threshold does not exceed the threshold, then decision 650 branches to "no" branch 675 bypassing steps 660 through 670.

A determination is made as to whether there are more instant messaging groups to process for the selected instant messaging message (decision 680). If there are more groups to process, then decision 680 branches to "yes" branch 682 whereupon, at step 683, the keyword counts are cleared (e.g., reset) and processing loops back to select the next instant messaging group at step 620. This looping continues until there are no more instant messaging groups to process, at which point decision 680 branches to "no" branch 684 whereupon another determination is made as to whether there are more instant messaging messages to process (decision 685). If there are additional instant messaging messages to process, then decision 685 branches to "yes" branch 688 whereupon, at step 689, the keyword counts are cleared and processing loops back to select the next instant messaging message at step 610 and process it accordingly. This looping continues until there are no more instant messaging messages to process, at which point decision 685 branches to "no" branch 692 and processing ends at 695.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
   selecting an instant messaging message that includes one or more words in a text area, wherein the selected instant messaging message is a communication with a first instant messaging participant, wherein the first instant messaging participant is associated with a first instant messaging participant identifier;
   selecting an instant messaging group, wherein the selected instant messaging group comprises a plurality of group members, each group member associated with one of a plurality of instant messaging participant identifiers, and wherein the instant messaging group is associated with one or more keywords, and wherein the instant messaging participant identifiers and the keywords are stored in an instant messaging group data store in a nonvolatile data area;
   determining whether the first instant messaging participant is a member of the selected instant messaging group;
   in response to determining that the first instant messaging participant is not a member of the selected instant messaging group, performing the following:
      identifying a count of the one or more words included in the selected instant messaging message that match the one or more keywords that are associated with the selected instant messaging group
      in response to the identifying, determining that the count exceeds a predetermined threshold; and
      in response to the determining, adding the first instant messaging participant to the selected instant messaging group, wherein the adding comprises adding the first instant messaging participant identifier to a list of instant messaging participant identifiers associated with the selected instant messaging group, the list stored in the instant messaging group data store.

2. The method of claim 1 wherein the predetermined threshold is one.

3. The method of claim 1 further comprising:
prior to the adding:
prompting a user whether to add the first instant messaging participant to the selected instant messaging group; and
receiving an answer from the user in response to the prompting, wherein the adding is only performed in response to the user answering that the first instant messaging participant should be added to the selected instant messaging group.

4. The method of claim 1 wherein the selected instant messaging message is one of a plurality of instant messaging messages being communicated during an instant messaging session that is currently being conducted between the first instant messaging participant and a second instant messaging participant, wherein the second instant messaging participant is a user of a computer system where the computer-implemented method is being performed, and the method further comprises:
performing the identifying step and the adding step for each of the plurality of instant messaging messages until the first instant messaging participant is added to the selected instant messaging group.

5. The method of claim 1 wherein the instant messaging message is selected from a plurality of archived instant messaging messages, wherein the archived instant messaging messages were previously communicated during a past instant messaging.

6. The method of claim 5 further comprising:
maintaining the count corresponding to each of the keywords that matches the one or more words;
prompting a user whether to add the first instant messaging participant to the selected instant messaging group in response to one of the counts corresponding to at least one of the keywords exceeding the predetermined threshold; and
receiving an answer from the user in response to the prompting, wherein the adding is only performed in response to the user answering that the first instant messaging participant should be added to the selected instant messaging group.

7. The method of claim 5 further comprising gathering the keywords associated with the selected instant messaging group, the gathering comprising:
retrieving the plurality of archived instant messaging messages;
retrieving a keywords data store corresponding to the select instant messaging group;
identifying non-trivial words that are unique and included in the retrieved plurality of archived instant messaging messages; and
storing the identified unique, non-trivial words in the retrieved keywords data store.

8. An information handling system comprising:
one or more processors;
a memory accessible by at least one of the processors;
a nonvolatile storage area accessible by at least one of the processors;
a set of instructions stored in the memory and executed by at least one of the processors in order to perform actions of:
selecting an instant messaging message that includes one or more words in a text area, wherein the selected instant messaging message is a communication with a first instant messaging participant, wherein the first instant messaging participant is associated with a first instant messaging participant identifier;
selecting an instant messaging group, wherein the selected instant messaging group comprises a plurality of group members, each group member associated with one of a plurality of instant messaging participant identifiers, and wherein the instant messaging group is associated with one or more keywords, and wherein the instant messaging participant identifiers and the keywords are stored in an instant messaging group data store in a nonvolatile data area;
determining whether the first instant messaging participant is a member of the selected instant messaging group;
in response to determining that the first instant messaging participant is not a member of the selected instant messaging group, performing the following:
identifying a count of the one or more words included in the selected instant messaging message that match the one or more keywords that are associated with the selected instant messaging group;
in response to the identifying, determining that the count exceeds a predetermined threshold; and
in response to the determining, adding the first instant messaging participant to the selected instant messaging group, wherein the adding comprises adding the first instant messaging participant identifier to a list of instant messaging participant identifiers associated with the selected instant messaging group, the list stored in the instant messaging group data store.

9. The information handling system of claim 8 wherein the predetermined threshold is one.

10. The information handling system of claim 8 further comprising:
prior to the adding:
prompting a user whether to add the first instant messaging participant to the selected instant messaging group; and
receiving an answer from the user in response to the prompting, wherein the adding is only performed in response to the user answering that the first instant messaging participant should be added to the selected instant messaging group.

11. The information handling system of claim 8 wherein the selected instant messaging message is one of a plurality of instant messaging messages being communicated during an instant messaging session that is currently being conducted between the first instant messaging participant and a second instant messaging participant, wherein the second instant messaging participant is a user of the information handling system, and wherein the set of instructions, when executed, cause at least one of the processors to perform further actions comprising:
performing the identifying step and the adding step for each of the plurality of instant messaging messages until the first instant messaging participant is added to the selected instant messaging group.

12. The information handling system of claim 8 wherein the instant messaging message is selected from a plurality of archived instant messaging messages, wherein the archived instant messaging messages were previously communicated during a past instant messaging session.

13. The information handling system of claim 12 wherein the set of instructions, when executed, cause at least one of the processors to perform further actions comprising:
maintaining the count corresponding to each of the keywords that matches the one or more words;

prompting a user whether to add the first instant messaging participant to the selected instant messaging group in response to one of the counts corresponding to at least one of the keywords exceeding the predetermined threshold;

receiving an answer from the user in response to the prompting, wherein the adding is only performed in response to the user answering that the first instant messaging participant should be added to the selected instant messaging group; and gathering the keywords associated with the selected instant messaging group, wherein the gathering comprises:
retrieving the plurality of archived instant messaging messages;
retrieving a keywords data store corresponding to the select instant messaging group;
identifying non-trivial words that are unique and included in the retrieved plurality of archived instant messaging messages; and
storing the identified unique, non-trivial words in the retrieved keywords data store.

14. A computer program product stored in a computer readable medium, comprising functional descriptive material that, when executed by an information handling system, causes the information handling system to perform actions that include:

selecting an instant messaging message that includes one or more words in a text area, wherein the selected instant messaging message is a communication with a first instant messaging participant, wherein the first instant messaging participant is associated with a first instant messaging participant identifier;

selecting an instant messaging group, wherein the selected instant messaging group comprises a plurality of group members, each group member associated with one of a plurality of instant messaging participant identifiers, and wherein the instant messaging group is associated with one or more keywords, and wherein the instant messaging participant identifiers and the keywords are stored in an instant messaging group data store in a nonvolatile data area;

determining whether the first instant messaging participant is a member of the selected instant messaging group;

in response to determining that the first instant messaging participant is not a member of the selected instant messaging group, performing the following:
identifying a count of the one or more words included in the selected instant messaging message that match the one or more keywords that are associated with the selected instant messaging group;
in response to the identifying, determining that the count exceeds a predetermined threshold; and
in response to the determining, adding the first instant messaging participant to the selected instant messaging group, wherein the adding comprises adding the first instant messaging participant identifier to a list of instant messaging participant identifiers associated with the selected instant messaging group, the list stored in the instant messaging group data store.

15. The computer program product of claim 14 wherein the predetermined threshold is one.

16. The computer program product of claim 14 further comprising functional descriptive material that causes the data processing system to perform additional actions that include:
prior to the adding:
prompting a user whether to add the first instant messaging participant to the selected instant messaging group; and
receiving an answer from the user in response to the prompting, wherein the adding is only performed in response to the user answering that the first instant messaging participant should be added to the selected instant messaging group.

17. The computer program product of claim 14 wherein the selected instant messaging message is one of a plurality of instant messaging messages being communicated during an instant messaging session that is currently being conducted between the first instant messaging participant and a second instant messaging participant, wherein the second instant messaging participant is a user of the information handling system, and the computer program product further comprises functional descriptive material that causes the data processing system to perform additional actions that include:
performing the identifying step and the adding step for each of the plurality of instant messaging messages until the first instant messaging participant identifier is added to the selected instant messaging group.

18. The computer program product of claim 14 wherein the instant messaging message is selected from a plurality of archived instant messaging messages previously communicated during a past instant messaging.

19. The computer program product of claim 18 further comprising functional descriptive material that causes the data processing system to perform additional actions that include:
maintaining the count corresponding to each of the keywords that matches the one or more words;
prompting a user whether to add the first instant messaging participant to the selected instant messaging group in response to one of the counts corresponding to at least one of the keywords exceeding the predetermined threshold; and
receiving an answer from the user in response to the prompting, wherein the adding is only performed in response to the user answering that the first instant messaging participant should be added to the selected instant messaging group.

20. The computer program product of claim 18 further comprising functional descriptive material that causes the data processing system to perform additional actions that include gathering the keywords, the gathering comprising:
retrieving a keywords data store corresponding to the select instant messaging group;
identifying non-trivial words that are unique and included in the retrieved plurality of archived instant messaging messages; and
storing the identified unique, non-trivial words in the retrieved keywords data store.

* * * * *